United States Patent
Johnson, III et al.

(10) Patent No.: US 9,519,642 B2
(45) Date of Patent: Dec. 13, 2016

(54) SYSTEM, METHOD AND COMPUTER PROGRAM PRODUCT FOR MULTILINGUAL CONTENT MANAGEMENT

(71) Applicant: Open Text SA ULC, Halifax (CA)

(72) Inventors: Claiborne Holt Johnson, III, Austin, TX (US); Mark R. Scheevel, Austin, TX (US); Michael Gerard Jaskiewicz, Urbandale, IA (US); David Alan Stiles, Fort Worth, TX (US); Ruhul Alam, Austin, TX (US)

(73) Assignee: Open Text SA ULC, Halifax (CA)

( * ) Notice: Subject to any disclaimer, the term of this patent is extended or adjusted under 35 U.S.C. 154(b) by 99 days.

(21) Appl. No.: 13/780,329

(22) Filed: Feb. 28, 2013

(65) Prior Publication Data

US 2014/0244236 A1    Aug. 28, 2014

(51) Int. Cl.
*G06F 17/28* (2006.01)
*G06F 9/44* (2006.01)
*G06F 17/30* (2006.01)

(52) U.S. Cl.
CPC ........... *G06F 17/289* (2013.01); *G06F 9/4448* (2013.01); *G06F 17/3089* (2013.01)

(58) Field of Classification Search
USPC ....................................... 704/1–10
See application file for complete search history.

(56) References Cited

U.S. PATENT DOCUMENTS

| | | | |
|---|---|---|---|
| 6,492,995 B1 | 12/2002 | Atkin | |
| 6,623,529 B1 * | 9/2003 | Lakritz | G06F 17/2288 707/E17.109 |
| 7,996,417 B2 * | 8/2011 | Travieso et al. | 707/761 |
| 8,689,117 B1 | 4/2014 | Vasilik | |
| 8,843,360 B1 * | 9/2014 | Johnston et al. | 704/8 |
| 8,887,044 B1 | 11/2014 | Goodspeed | |
| 8,914,736 B2 | 12/2014 | Cardasco | |
| 8,942,973 B2 * | 1/2015 | Viswanathan | 704/5 |

(Continued)

OTHER PUBLICATIONS

Office Action for U.S. Appl. No. 14/153,863, mailed Dec. 2, 2015, 14 pgs.

(Continued)

*Primary Examiner* — Barbara Reinier
(74) *Attorney, Agent, or Firm* — Sprinkle IP Law Group

(57) ABSTRACT

A system includes a processor and a non-transitory computer readable medium storing instructions translatable by the processor. The instructions when translated by the processor cause the system to determine an exemplar reference which identifies a managed object stored in a repository residing in an enterprise computing environment. The system can determine a translation group utilizing the exemplar reference. The managed object may represent a content item. The translation group may include the content item and the content item may be multilingual enabled. The system can determine an effective locale for a request for content received from a client device communicatively connected to a web server in the enterprise computing environment, determine a language that is appropriate for the effective locale, and respond to the request for content with the content item or a translation of the content item that is in the language appropriate for the effective locale.

23 Claims, 7 Drawing Sheets

(56) References Cited

U.S. PATENT DOCUMENTS

| | | |
|---|---|---|
| 2002/0143468 A1 | 10/2002 | Cheng |
| 2003/0005159 A1* | 1/2003 | Kumhyr .............. G06F 17/3089 709/246 |
| 2003/0140316 A1 | 7/2003 | Lakritz |
| 2006/0294199 A1 | 12/2006 | Bertholf |
| 2007/0180143 A1 | 8/2007 | Greeff |
| 2013/0031166 A1 | 1/2013 | Jayaraman |
| 2013/0054745 A1 | 2/2013 | Ando |
| 2013/0262078 A1 | 10/2013 | Gleadall |
| 2014/0108971 A1 | 4/2014 | No |
| 2015/0161227 A1 | 6/2015 | Buryak |

OTHER PUBLICATIONS

Office Action for U.S. Appl. No. 14/153,863, mailed Aug. 11, 2016, 11 pgs.

* cited by examiner

| New Content Type Definition | |
|---|---|
| General | Attributes | Site Associations | Workflow | Wrapper Settings | Multilingual Settings | Properties | Security | Status ~310 | |

Language Widget Placement: (i)  [No selection ▼]
330            320             Place it after the above selected attribute.

Multilingual: (i) ☑ Enable
340

Create new instances as:  (i)  ⦿ Part of a translation family
                              ○ Not part of a translation family Translation Folder: (i)  ⦿ Same as Source Translation
350                      ○ Translation Sub Folder
                         ○ Java Class Handler...

Translation Channels: (i)   ⦿ Initialized from Source Translation then synchronizable
370                         ○ Independent from Source Translation Translation Categories: (i) ⦿ Initialized from Source Translation then synchronizable
360                         ○ Independent from Source Translation Translation Scheduled Publishing: (i) ⦿ Initialized from Source Translation then synchronizable
390          380                      ○ Independent from Source Translation Translation Workflow: (i)  [........]  [...]  [Clear]

[OK] [Cancel]   [Apply] [Approve]   [Help]

FIG. 3

SYSTEM, METHOD AND COMPUTER PROGRAM PRODUCT FOR MULTILINGUAL CONTENT MANAGEMENT

TECHNICAL FIELD

This disclosure relates generally to enterprise-class multilingual websites and endpoint hardware and software supporting same. More particularly, this disclosure relates to evolutionary technologies for building and maintaining multilingual websites with reduced cost and complexity of life-cycle maintenance associated therewith.

BACKGROUND

Enterprises are complex organizations that often span multiple geographies, cultures, and authorities. Enterprises may include long-lived software systems such as websites that are accessible through a web-tier by a potentially unlimited number of end users. Such software systems may also include content management systems configured to manage content items used by the websites.

Initially, an enterprise may develop a website for a specific locale or region. In doing so, the enterprise may produce, manage, and publish monolingual content for the website. Often a content management system supporting the website is also monolingual. A later expansion by the enterprise to cover a different locale or region may require that their website(s) and content management system(s) support multilingual content. Through continual cycles of upgrade and redevelopment required for new and expanded functionality, enterprise-class software systems supporting enterprise web sites can accrue significant cost and complexity.

To this end, efforts have been made in conventional content management systems to manage multilingual content using either a translation-centric or an object-centric model. Translation-centric solutions manage translations of content as distinct objects and do not associate different translated versions of the content with each other. Object-centric solutions model translated versions of content as different values/versions of the same object, and require additional metadata to identify what translated versions of content are related on the web-tier. Object-centric solutions require independent management for each of the translated versions of content on the web tier. More specifically, translation-centric solutions model translations as different objects to provide independent life-cycles for translations. However, translation-centric solutions suffer from high reference maintenance cost associated with continual modification to existing software to refer to new translations. Object-centric solutions model translations as different values of the same object, thereby avoiding the reference maintenance cost problem. However, object-centric solutions suffer from tight coupling of translations to the life-cycle of a single object. This increases maintenance cost when translations need to be decoupled, for instance, in the event those translations diverge, or if they otherwise need to be managed independently.

Consequently, today's content management systems continue to struggle with various issues such as cost and complexity involved in managing multilingual content. Embodiments disclosed herein provide a new multilingual content management solution that can achieve the benefits of prior solutions without their deficiencies.

SUMMARY OF THE DISCLOSURE

An object of the invention disclosed herein is to significantly reduce the cost and complexity associated with multilingual content management. This object is achieved in embodiments disclosed herein by identifying and exploiting evolutionary methods for introducing and developing new functionalities, for instance, grouping content items that are translations of each other. Evolutionary technologies promote change through transformational adaptations to existing technologies that enable preservation of existing technologies with flexible migration toward new capabilities.

To this end, embodiments provide a system, method, and computer program product for multilingual content management that allows websites, particularly enterprise-class websites, to evolve to support multilingual content. Some embodiments can be implemented as part of a web experience management (WEM) system.

In some embodiments, a multilingual content management system includes a plurality of unique features configured to provide maximum flexibility in supporting enterprise-class software systems, including creation of multilingual content and sites from scratch, upgrading/migrating existing, monolingual content and sites to multilingual content and sites, etc. In some embodiments, salient features of a multilingual content management system can include:

Evolutionary Multilingual Content, based on Translation Group Management

Declarative Web Site Language Targeting, based on Locale Eligibility Management

Dynamic Web Page Language Rendering, based on Locale Resolution Management

These features all share a formative, underlying principle whereby the same object references may be interpreted simultaneously as either a discrete, monolingual content item or a composite, multilingual content item, depending on context. Such references (referred to herein as "exemplar references") can provide flexibility when and where an application chooses to evolve multilingual content. An "exemplar reference", in this context, refers to any reference to a multilingual content item that can act as an "exemplar" for other content items. As multilingual content evolves, exemplar references further provide the flexibility in how content can be mapped to sites and rendered by pages.

To this end, in some embodiments, in response to a request for content received from a client device communicatively connected to a web server in an enterprise computing environment, a system may determine an exemplar reference that identifies a managed object. The system may utilize the exemplar reference to determine a translation group. When a new content item is created, it can be multilingual enabled and assigned to a translation group. An existing content item can also be updated to reflect an assignment to the translation group. Content items in the same translation group are assigned to a single translation group identifier and each of the members of the translation group has a unique identifier. The system may determine an effective locale for the request for content received from the client device and determine a language that is appropriate for the effective locale. Accordingly, utilizing the exemplar reference, the request for content can be dynamically resolved and the requested content can be dynamically rendered and delivered in the language that is appropriate for the effective locale.

Embodiments disclosed herein can provide many advantages. For example, embodiments can provide an evolutionary software solution achieving the benefits of both conventional translation-centric and object-centric models while avoiding the problems plaguing these models. Exemplar references are a transformational adaptation of existing object references enabling the same, without change, to refer to either a discrete translation or any of a composite, multilingual group of translations. This preserves investment upon upgrade of existing software and avoids the reference maintenance cost and complexity associated with translation-centric models. Meanwhile, translation group management provides a flexible, bidirectional migration path between monolingual and multilingual content, allowing incremental and independent introduction of translations while avoiding the tight coupling of life-cycles associated with object-centric models. According to embodiments disclosed herein, exemplar references can intrinsically relate content items that are translations of each other in a translational group so that life-cycle management features such as creating, publishing, exporting, importing, versioning, etc. of the translation group may be performed simultaneously for each of the group's content items. This advantageously eliminates the need to have additional mechanisms to manage, control, and/or translate content items in a translation group. As noted above, such additional mechanisms are often required in conventional content management systems.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 3 depicts a diagrammatic representation of a portion of a content type modeling program for a multilingual content management system implementing a content management object model in accordance with one embodiment.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing specific embodiments, a brief overview of an example system architecture of the disclosure may be helpful.

Figure 1:
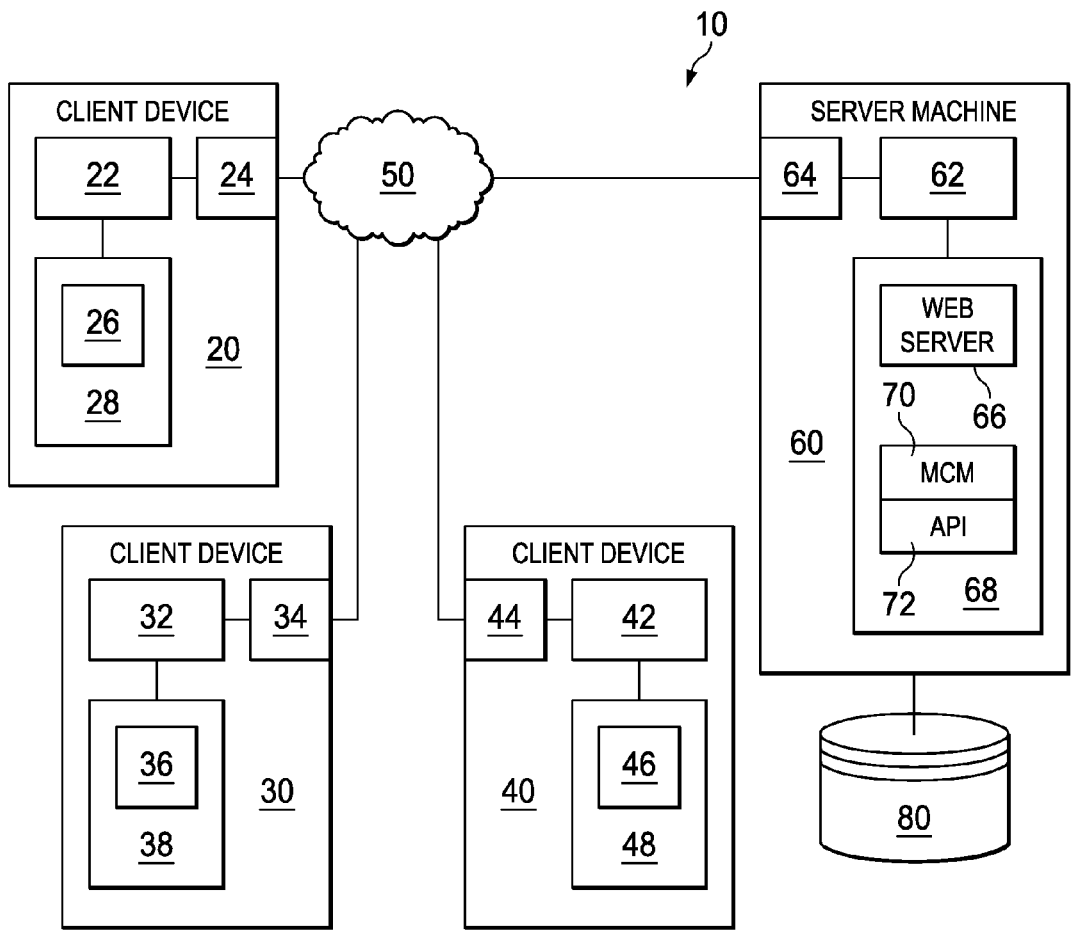
FIG. 1 depicts a diagrammatic representation of an example client-server computer system where embodiments can be implemented.

FIG. 1 depicts a diagrammatic representation of an example client-server computer system 10 where embodiments can be implemented. System 10 includes client devices such as client devices 20, 30, and 40, and one or more server machines such as server machine 60. As illustrated in FIG. 1, client devices 20, 30, and 40 and server machine 60 can be connected via standard transmission channel 50, which may be a wired and/or wireless network including a local area network (LAN), wide area network (WAN), the Internet, or other wired and/or wireless network.

Each client device in system 10 (e.g., client devices 20, 30, and 40) can be a standard computer including a central processing unit ("CPU") (e.g., CPU 22, CPU 32, and CPU 42), a network connection device (e.g., network interface 24, network interface 34, and network interface 44), and a non-transitory computer readable medium (e.g., computer readable medium 28, computer readable medium 38, and computer readable medium 48. Computer readable medium 28 can comprise any combination of a primary memory, a secondary memory, a random access memory (RAM), a read only memory (ROM), and/or a magnetic storage device such as a hard drive (HD) or other non-transitory computer readable storage medium. Each computer readable medium may store a number of computer programs. For example, computer readable medium 28 may store a browser 26. As known to those in the art, a browser application can be used to communicate with remote server computers such as server machine 40 and to visually present the information received from server machine 40. Each client device can establish network communications through transmission channel 50. As an example, server machine 40 may host a network site and a network site visitor may visit the network site using browser 26 running on client device 20.

Server machine 60 can include a plurality of server computer components, including a CPU 62, a network connection device 64, and a non-transitory computer readable medium 68. Computer readable medium 68 can comprise any combination of a primary memory, a secondary memory, a RAM, a ROM, and/or a magnetic storage device such as a HD or other non-transitory computer readable storage medium. Computer readable medium 68 may store a number of computer programs. As shown in FIG. 1, server machine 60 stores web server program 66 for servicing requests from client devices such as client devices 20, 30, and 40 over transmission channel 50. Server machine 60 can also act as a content management system running multilingual content management (MCM) system program 70 (MCM 70).

Embodiments of a MCM system will now be described in detail below.

Content and related information managed by MCM 70 can be stored in repository 80. MCM 70 and repository 80 can be used to create, test, modify, manage and store page templates and other content belonging to an entity such as an enterprise or organization. To this end, client devices such as client devices 30 and 40 can be used by administrators and enterprise users to access MCM 70 and repository 80. For example, computer readable medium 38 may store a number of computer programs, including a content type modeling program 36. Content type modeling program 36 can interface with MCM 70 running on server machine 60, requesting information from repository 80 and/or causing MCM 70 to take appropriate action, and visually present the information received from MCM 70. Likewise, computer readable medium 48 may store a number of computer programs, including a site management program 46. Example features of a content type modeling program and a site management program are provided below. In this disclosure, client devices 30 and 40 are non-limiting examples of MCM client devices.

Repository 80 may store objects managed by MCM 70. In this disclosure, objects managed by MCM 70 and stored in repository 80 may include objects of the following object types:

Site: A "site" object refers to a logical container for content instances and channels representing a site structure. A site object serves as the online endpoint (which can be a web site) for content published on the web-tier.

Channel: A "channel" object refers to a logical node in a site structure to which content items can be associated. In this context, "channels" can be used to organize and manage user access to managed content. As a specific example, a web site may have channels such as news, sports, entertainment, etc., each being represented by a channel object in the site navigation tree of the web site and accessible by visitors of the web site through, for instance, a page or a link in the web site domain.

Content type: A "content type" object contains a logical definition for a piece of structured content that results in a form editable by end users of MCM 70 (e.g., a user of client device 40) for creating or editing content. In some embodiments, MCM 70 may support content types that meet common content management and presentation management requirements (e.g., images, videos, pages, regions, components, themes, and more.)

Content instance: A "content instance" object refers to an individual piece of content created from a given content type definition (contained in a "content type" object).

Static file: A "static file" object refers to any individual file uploaded by an end user of MCM 70 and managed as such by MCM 70. MCM 70 can support all current file formats. Some formats such as images and videos can be supported with extra features such as metadata extraction.

Category: A "category" object refers to a logical node in a global classification that can be assigned to content items and used to drive personalization rules or web analytics reports. Examples of content items are provided below.

Each of the objects types listed above is defined by a variable number of attributes (e.g., name and description are default attributes for each object) with default settings which can be configured if needed. Those skilled in the art will appreciate that the objects types listed above are meant to be exemplary and non-limiting and that additional object types not listed here are possible.

Instances of the object types above are called "managed objects", which obey a number of predetermined rules and properties when it comes to the content life cycle and the security model (e.g., logical placement in the repository, approval and publishing rules, etc.). From a class hierarchy standpoint, these object instances can be represented in a content management object model.

Figure 2:
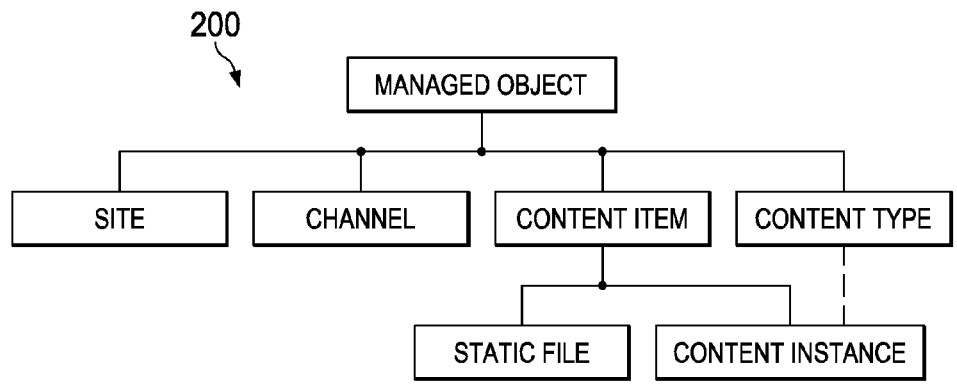
FIG. 2 depicts diagrammatic representation of an example content management object model in accordance with one embodiment.

FIG. 2 depicts a diagrammatic representation of an example content management object model 200. Content management object model 200 may be utilized to manage content for web sites. Each web site may have a collection of objects, including file assets and non-file assets. Non-file assets can include assets such as users, groups, modules, module types, pages, menus, themes, structures, styles and templates, logon permissions, administrative permissions, site branding, site content, site navigation, instantiated programming language objects, permissions, user preferences and settings. Various content objects may reference file assets including resources such as code including JSP pages, ASP pages, Java classes and/or object oriented programming language classes, and images including GIF files, etc. It should be noted that such assets belonging to an entity may be shared among the entity's web sites and thus the collections of objects for the web sites need not be mutually exclusive.

With continued reference to FIG. 2 and referring again to FIG. 1, a "content item" may represent a piece of content that is either of the "content instance" object type or of the "static file" object type described above. Content items can be stored as corresponding content objects in a repository such as repository 80. In some cases, rather than storing the content items, repository 80 can include references to another system and its corresponding objects or repository. Each content object can have an arbitrary amount of metadata associated with it. For purposes of web site management, such metadata may include whether the content object has been approved for publication, whether it was published, or any other information that is useful in classifying the content object for web site management.

It should be noted that managed objects can be stored at a central location (e.g., repository 80) or they can be distributed. For example, a content item may be stored at another location and a reference to the content item stored in repository 80. As a specific example, a bank statement may reside in an enterprise system and a reference to the bank statement may be stored in repository 80 and managed by MCM 70.

As noted above, programs running on client devices (e.g., content type modeling program 36 executing on client device 30 and site management program 46 executing on client device 40) can be used to communicate with MCM 70 running on server machine 60. Such programs can be accessible by a keyboard, mouse, and/or touch and viewed on a display for each client device. For example, content type modeling program 36 can request information or initiate actions at MCM 70 by sending requests that are translated into API calls to API 72 (e.g., by web server program 66 or other program). In response, MCM 70 will return the appropriate data and/or take the appropriate actions. One example action may be to define a new content type definition per user inputs received via content type modeling program 36.

FIG. 3 depicts a diagrammatic representation of a portion of a content type modeling program 300. In this case, the depicted portion represents multilingual settings 310 of content type modeling program 300. In some embodiments, content type modeling program 300 can be part a multilingual content management system implementing a content management object model disclosed herein. According to one embodiment, content type modeling program 300 can be part of MCM 70 shown in FIG. 1.

An authorized user such as an administrator in an enterprise computing environment may navigate to multilingual settings 310 through an instance of content type modeling program 300 running on a client device (e.g., client device 30) which is communicatively connected to MCM 70 at the backend as described above. As illustrated in FIG. 3, in one embodiment, multilingual settings 310 may have a set of attributes, including Language Widget Placement 320, Multilingual 330, Create new instances 340, Translation Folder 350, Translation Channels 360, Translation Categories 370, Translation Scheduled Publishing 380, and Translation Workflow 390.

Content type modeling program 300 can be used to configure a content item editing program. An end user in the enterprise computing environment may utilize the content item editing program to create and/or edit a piece of content managed by a multilingual content management such as MCM 70. An example interface for a content item editing program is described below.

Figure 4:
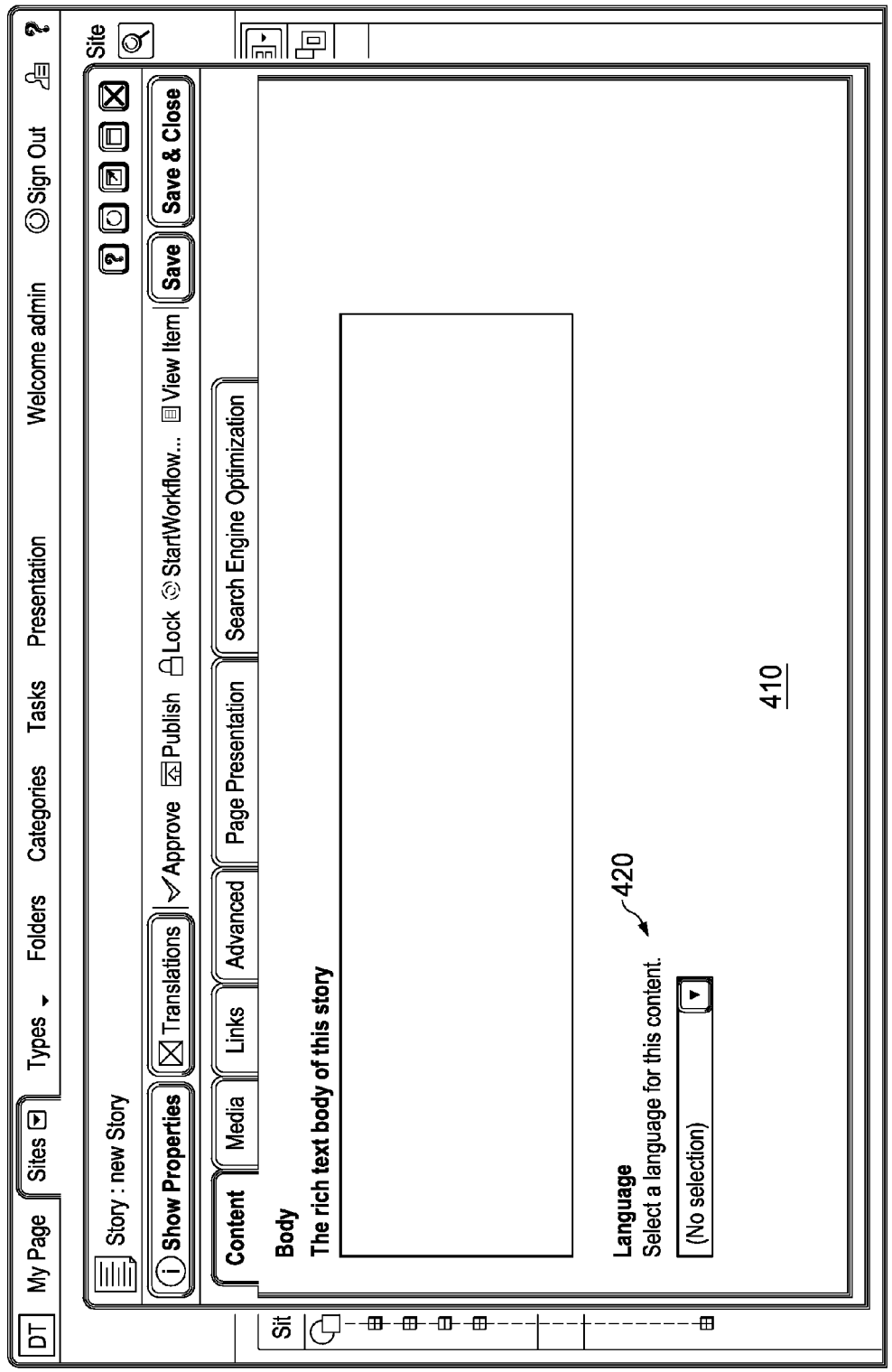
FIG. 4 depicts a diagrammatic representation of a portion of a site management program in accordance with one embodiment.

FIG. 4 depicts a diagrammatic representation of a portion of a site management program 400. In this case, the depicted portion represents content item editing program 410 of site management program 400. In some embodiments, site management program 400 can be part a multilingual content management system implementing a content management object model disclosed herein. According to one embodiment, site management program 400 can be part of MCM 70 shown in FIG. 1. Notice in this example, content item editing program 410 includes a language widget 420 located below a text box provided to a user of content item editing program 410 (e.g., an enterprise user in an enterprise computing environment where server machine 60 resides). According to one embodiment, language widget 420 may include a dropdown menu listing available languages that can be selected for a content item.

With continued reference to FIG. 4, and referring again to FIG. 3, a user of content type modeling program 300 (e.g., a user of client device 30 shown in FIG. 1) can decide whether to present language widget 420 to a user of content item editing program 410 (e.g., a user of client device 40 shown in FIG. 1). If no placement selection is made via Language Widget Placement 320, language widget 420 will not be presented via content item editing program 410. In the example of FIG. 3, a selection "Place it after the above selected attribute" is made and, as a result, language widget 420 is subsequently presented via content item editing program 410 as shown in FIG. 4.

Notice also in this example, Multilingual 330 is enabled, causing Translation Folder 350, Translation Channels 360, Translation Categories 370, Translation Scheduled Publishing 380, and Translation Workflow 390 to be displayed as selectable attributes in multilingual settings 310. According to one embodiment, if Multilingual 330 is disabled, Translation Folder 350, Translation Channels 360, Translation Categories 370, translation Scheduled Publishing 380, and Translation Workflow 390 will also be disabled.

Figure 5:
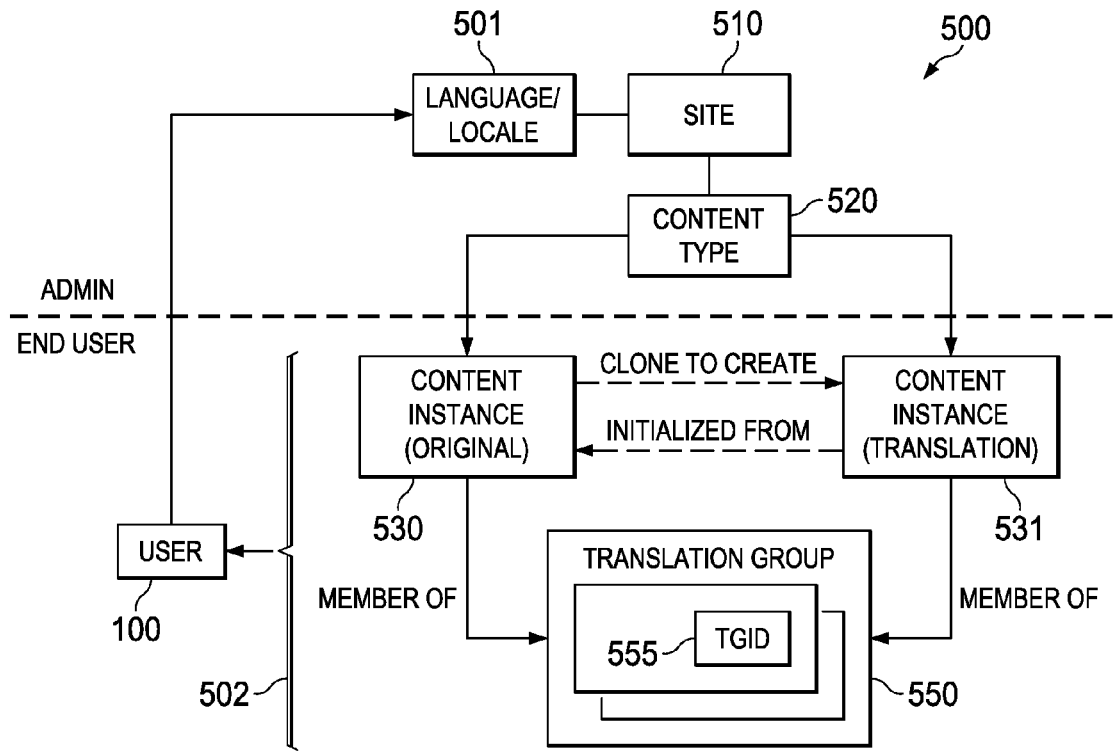
FIG. 5 depicts a flow diagram illustrating an example of a multilingual content management data flow in accordance with one embodiment.

FIG. 5 depicts a flow diagram illustrating an example of a multilingual content management data flow 500. A user 100 in an enterprise computing environment may set a language/locale preference or default 501 for a site 510 using a language widget (e.g., language widget 420 of content item editing program 410 shown in FIG. 4). Site 510 may have a content type 520 with a multilingual attribute enabled. As described above, site and content type objects may be created by authorized users such as an administrator in an enterprise computing environment. In this case, site 510 is configured to support multilingual content management and thus user 100 is allowed to set language/locale preference or default 501 for site 510.

User 100 may create an original content instance 530 of content type 520 using the default language (also referred to herein as the source language) and select one or more languages (also referred to herein as the target language(s)) to translate. Various translation methods can be utilized to perform the translation(s). For example, original content instance 530 can be duplicated to create a new content instance (e.g., translation 531) which can be edited by user 100. The creation of the new content instance can be manual or automatic (e.g., through a translation workflow). As another example, user 100 may select an existing content item to assign it as a translation instance for original content instance 530.

As illustrated in FIG. 5, by virtue of enabling the multilingual attribute for content type 520, original content instance 530 and its translation(s) are automatically members of a translation family or group 550 having a translation group identification (TGID) 555. Members in translation group 550 all have the same TGID 555.

Aspects of translation group management will now be described.

Figure 6:
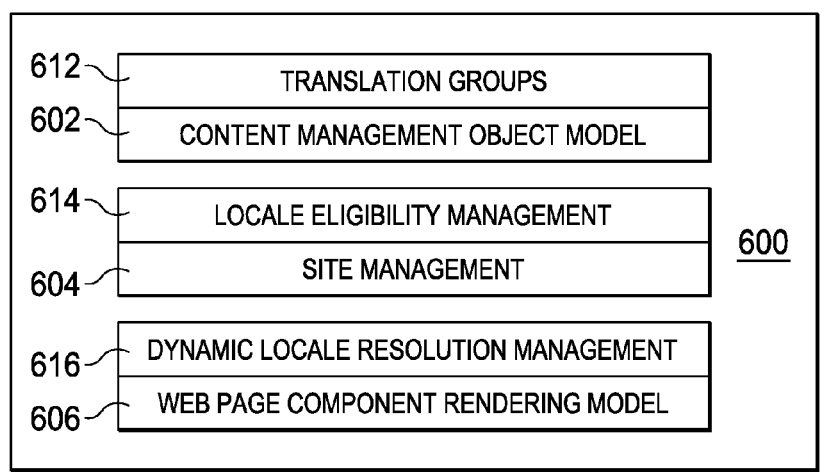
FIG. 6 depicts a diagrammatic representation of a multilingual content management system in accordance with one embodiment.

FIG. 6 depicts a diagrammatic representation of a multilingual content management system 600 having a content management object model 602, a site management program 604, and a web page component rendering model 606.

Content management object model 602 can be the same or similar to content management object model 200 shown in FIG. 2. Additionally, content management object model 602 can include translation groups 612. In this disclosure, a translation group is used to relate content items. Assigning the same identifier to multiple content items establishes a translation group. Content items in the translation group may be added or removed at any time. Applied to multiple instances of the same content type, each member of the translation group represents the same content translated into different languages. The translation group represents a composite, multilingual content item. Meanwhile, each of its members remains a content item fully capable of an independent life-cycle.

The significance of the concept of a translation group can be demonstrated through exemplar references. Exemplar references allow any member of a translation group to function as an independent content item or as an extensible, multilingual content item whose composition and effective resolution, described below, depend on the context in which the reference occurs. In mathematical terms, translation defines an equivalence relation over content, and a translation group is the equivalence class of the exemplar, which may assume its identity.

Translation groups may be assembled (or dissembled) using new or existing content items as members. Any member of a translation group may function as an exemplar, and this happens implicitly anywhere that member's identity is referenced. This includes any channel association or dependency reference to that content item. Moreover, since any content item may be added to, or removed from, a translation group at any time, essentially this means that all references in the system are potentially exemplar references, capable of referring to that individual content item or its translation group, whose membership may change over time. This provides significant flexibility for both multilingual evolution and site deployment. Referring back to FIG. 5, for example, exemplar reference 502 may reference original content instance 530, translation 531, or translation group 550.

Exemplar references allow existing, monolingual content to transform intrinsically into multilingual content based on discretionary, incremental introduction of translation groups. This provides an essential migration path for applications that must preserve substantial investments in existing sites and pages. Without changing or republishing any channel associations or dependency references, sites with potentially large and complex navigation and interrelationship of content may remain functionally intact and operational, while exemplar references implicitly transform from monolingual into multilingual content by superimposing translation groups and members.

Meanwhile, new translation group members become exemplars upon reference, and groups may be divided or arbitrarily refactored at any time. For instance, if divergent evolution of translation members warrants, groups may be branched for differentiation or specialization of new multilingual content. Based on exemplar references, this may all be accomplished in situ, without modification to channel associations or dependency references.

Exemplar references also allow the same content to be shared by multiple sites with different multilingual composition, including single member (monolingual) composition. In other words, multilingual evolution for the same content can be managed independently for different sites. This is accomplished using locale eligibility management.

Aspects of locale eligibility management will now be described.

Conventional web sites have no intrinsic, multilingual support. Furthermore, they may be considered non-multilingual, rather than monolingual, since they are essentially language agnostic, allowing content in any language. For site management 604, this can be the default behavior for sites; if no supported locales are declared, translation groups are ignored, and exemplar references are interpreted and deployed as discrete, monolingual content items without regard to their translation groups or languages. This default behavior provides backward compatibility when upgrading existing sites as well as an option to maintain traditional, non-multilingual sites alongside multilingual sites.

As illustrated in FIG. 6, site management 604 of multilingual content management system 600 may include locale eligibility management 614. Locale eligibility management 614 may allow an enterprise user to declare locale eligibility for a site (e.g., site 510 shown in FIG. 5). Declaring locale eligibility transforms a non-multilingual site into a multilingual site. Locale eligibility management 614 may allow an enterprise user to define which languages (more specifically, locales) are supported by which sites. Supported locale eligibility provides the context according to which exemplar references for translation groups are transformed into composite, multilingual content. The enterprise user may further refine which of those supported languages are required by which sites. Required locale eligibility can establish stricter constraints. Both supported locale eligibility and required locale eligibility are further described below.

Aspects of locale resolution management will now be described.

As illustrated in FIG. 6, web page component rendering model 606 of multilingual content management system 600 may include dynamic locale resolution management 616. Dynamic locale resolution management 616 may determine how exemplar references are transformed, or resolved, at page rendering time into their corresponding translation group members. Based on the effective locale relative to a given page request, it allows the same page components to be rendered in different languages, automatically choosing the appropriate language for each request.

From this perspective, exemplar references are a salient aspect for locale resolution. They allow pre-existing, non-multilingual/monolingual pages and components to be transformed implicitly, while remaining unchanged, into multilingual pages and components based on translation groups and membership. They allow pages and components to be developed and managed in one language, rendered in others, and evolve automatically along with translation groups.

The term "exemplar" is used in this disclosure to reflect the concept/significance of the ability to use any reference to refer to a multilingual content item. An "exemplar" can be any object being referenced, whether by channel-association or some arbitrary, user-defined reference. More specifically, an object becomes an "exemplar" when the object being referenced is a member of some translation group—in other words, when it is one of the translations of a multilingual content item. Because, in that case, the referenced object behaves as a placeholder for the translation group at large. For example, for "locale-resolution" on delivery, although the reference is to a particular translation (the exemplar), resolution can locate and substitute the appropriate translation based on the request locale. That resolution process relies on knowing the translation group to which the exemplar belongs, so it can determine that group's membership in order to select the appropriate translation. The reference attribute alone is not able to indicate the exemplar's translation group; rather, it must resolve that reference to find the exemplar object, then from the exemplar object, find the exemplar object's translation group and that group's members.

This is where the significance of the exemplar arises: certain multilingual content management features, such as locale-resolution, cannot be fulfilled if the exemplar reference cannot be resolved. This could happen if an exemplar were unpublished or deleted, leaving a dangling reference from another object. However, since other members of that translation group remain, the risk of unpublishing or deleting one of the translations, should it be an exemplar, may be less obvious to the user, especially when there is no indication which translations are functioning as exemplars. Accordingly, some embodiments may optionally be configured to provide some intervention in the form of API exceptions or user interface (UI) warnings/confirmation dialogs to advise the user when they risk dangling an exemplar reference by unpublishing or deleting it.

The term "locale eligibility" refers to publishing constraints affecting multilingual content on multilingual sites. The constraints relate to the site's locales that are supported or required.

Aspects of support locale eligibility will now be described.

Declaring locales for a site indicates which languages the site supports. Locales can be added or removed from that list over time to change the site's supported languages. When a translation group member is published to the site, whether directly or indirectly through some exemplar reference, other members of the exemplar's translation group that are among the site's supported languages are automatically included in the publishing operation. The result is a multilingual content item composed of the site's supported languages.

Furthermore, supported locale eligibility may be used to segment and target translations for the same multilingual content item to different sites, resulting in different compositions for that content at those sites. Different sites may define overlapping or disjoint sets of supported locales. A single site may support all languages, or parallel sites may each declare a distinct language. Dynamic composition and resolution of exemplar references allows site languages to evolve flexibly and orthogonally from translation group membership.

Aspects of required locale eligibility will now be described.

Any subset of the site's supported locales may optionally be declared as required. If so, that subset defines the required locale eligibility for the site. Required locale eligibility establishes stricter publishing constraints to ensure all multilingual content items consist of all required translations. In other words, it imposes a necessary and sufficient publishing condition upon translation group membership and prevents publishing an incomplete multilingual content item missing any required language. Conversely, it prevents unpublishing a proper subset of required members which would leave a published incomplete multilingual content item.

Required locale eligibility may be used for various purposes. For instance, it may impose more rigorously the default language for a site, ensuring that any multilingual content that is published always consists of a translation in that language. It may be used to comply with business or regulatory requirements for specific language translations. In general, it allows delivery applications to assume that the composition of all multilingual content items includes translation group members in the required languages. This allows an exemplar reference locale resolution to be assumed for those languages.

When a site declares certain locales to be required, it means that multilingual content published to that site must contain translations for those locales. If it does not—for instance, if one of the required translations either does not exist or is not approved—that multilingual content would be "locale ineligible", and it should not be published. Conversely, if an unpublish operation were to remove some, but not all, translations for some multilingual content, that may also constitute a violation of the site's required locales, if it were to leave a proper subset of them published.

Accordingly, new locale-eligibility constraints are added to both publishing and unpublishing which can result in warnings or errors preventing invalid operations. New logic is also added to both publish and unpublish job creation to facilitate locale eligibility by automatically expanding exemplars to include in the job the appropriate translations from its group. In this way, multilingual content may get included in a job through arbitrary references from other content. As a specific example, in one embodiment, for unpublishing, this expansion is controlled by an advanced option called "Unpublish Translations" which defaults to the value of a new configuration variable called "DEPLOYMENT_UNPUBLISH_TRANSLATIONS," which defaults to true. Here, multilingual content is treated as groups for both publishing and unpublishing, although the user is allowed to override this behavior to unpublish individual translations, provided the unpublish action does not violate locale eligibility. This enables the ability to utilize constraints for an unpublish operation in a content management system. In contrast, conventional content management system, unpublish operations have always been unconstrained.

Aspects of unsupported locale eligibility will now be described.

Another aspect of locale eligibility relates to "unsupported" locales—locales that are not among a site's supported set of locales. When certain locales are declared as supported for a site, this means that other locales are not supported. A multilingual translation with an unsupported locale should not be published to the site. Accordingly, job creation exemplar expansion omits from the job any unsupported translations.

However, an exception is made when an exemplar's locale is unsupported. This is because by definition an exemplar is either a direct association or some explicit reference from other content in the job. Thus, an exemplar will not be omitted and will be included regardless of their locale for referential integrity. This can avoid having the exemplar reference dangling on the delivery stage. In one embodiment, if an exemplar's locale is unsupported, a warning may be issued and presented to a user in case the user wants to correct the situation, perhaps by replacing the exemplar with some other, supported translation from the same group. Nevertheless, the user is allowed to choose to publish the unsupported exemplar.

Aspects of applicability will now be described.

In some cases, it may not be obvious as to when locale eligibility constraints apply. To this end, a locale eligibility applicability rule may specify that locale eligibility only applies to multilingual content published/unpublished to/from multilingual sites. A site is multilingual provided it declares at least one locale. A content item is multilingual if it belongs to some translation group. If it does, it may or may not nevertheless have a locale. Accordingly, another locale eligibility applicability rule may specify that locale eligibility only applies to content items with locales.

Since locale eligibility applicability rules constrain which locales to include or omit, they do not apply to content items (which may include some translations) that have no locale. What these locale eligibility applicability rules mean is that the same content published to different sites may present different warnings or errors, since locale eligibility relates to each site's configuration. If a content item is not multilingual, yet it has an unsupported locale, it may be published without warning.

Aspects of multilingual content publishing/unpublishing will now be described.

Aspects of multilingual content publishing will now be described.

Multilingual publishing rules only apply when publishing to a multilingual site (i.e., a site declared with at least one locale.) If the site is not multilingual, the following multilingual publishing rules do not apply.

When a multilingual channel is included in the job, any and all of its channel localized data is deployed. In accordance with one embodiment, there is no filtering or eligibility constraint based on locale for a channel.

When a content item (e.g., a content instance of a static file) is included in a job due to explicit channel association or object reference (which means that the content item in this case is an "exemplar"), it is included regardless whether it is multilingual, whether it has a locale, or whether that locale is among the site's supported list. In other words, exemplars are always included in the job.

When a multilingual content item is included in a job, so are all of its translations that are among the site's supported list of locales. Translations that are not among the site's supported list are omitted from the job.

Any object included in a job must be eligible (namely, status-approved and time-eligible, if applicable), or a prior-published descendent, if a "lenient" policy (which is explained further below) is in use. This "standard" or "non-multilingual" eligibility is assessed first. If a content item fails standard eligibility rules, the job is invalid, and an error message (e.g., "JobItemStatusMsg") is sent.

For any multilingual content item that is included in a job, if its locale is not among the site's supported list of locales (which, as explained above, can only happen for exemplars), the content item is included with a warning message.

For any multilingual translation group included in a job, if not all the site's required locales are included/eligible, the job is invalid, and all missing required members of that group are indicated as errors. These errors may indicate non-existing objects. In accordance with one embodiment, an attribute "ExcludedJobItem" may identify the referrer as one of the existing group members (which may be eligible), so that the referrer may be used to build a valid hyperlink to an editor from which a new (required) translation may be created.

Aspects of multilingual unpublishing will now be described.

Multilingual unpublish jobs enforce "inverse" required, locale-eligibility consistent with publish job validation. That is, an unpublish job is invalidated if it attempts to unpublish a proper subset of published, site-required translations. As with publish validation, this prevents multilingual content being published to a site lacking translations for all required locales.

Per the above-described advanced "unpublish translations" option with default true, an unpublish job will by default include all translations, and therefore be valid. In accordance with one embodiment, only if a user disables the "unpublish translations" option (either globally in the configuration default setting, or selectively on a given unpublish job), is an unpublish job invalidation possible. And then, only if the site specifies multiple required locales, translations for those locales are published, and the user attempts to unpublish a proper subset of them.

In accordance with one embodiment, the invalidation can occur for all levels of an approval policy, including a "lenient" level thereof. This means that no user is allowed to proceed with a required locale ineligible unpublish job. Making the unpublish fatal at any level can ensure that the site contains all (or none) of its required translations. In accordance with one embodiment, an exception may be made to allow a user (e.g., a content contributor or creator) to proceed under a lenient policy which allows omission of a required translation if some prior version of it is already published. In this case, a non-fatal warning is issued for a locale ineligible unpublish job, but the job is allowed to proceed at the user's discretion.

Figure 7:
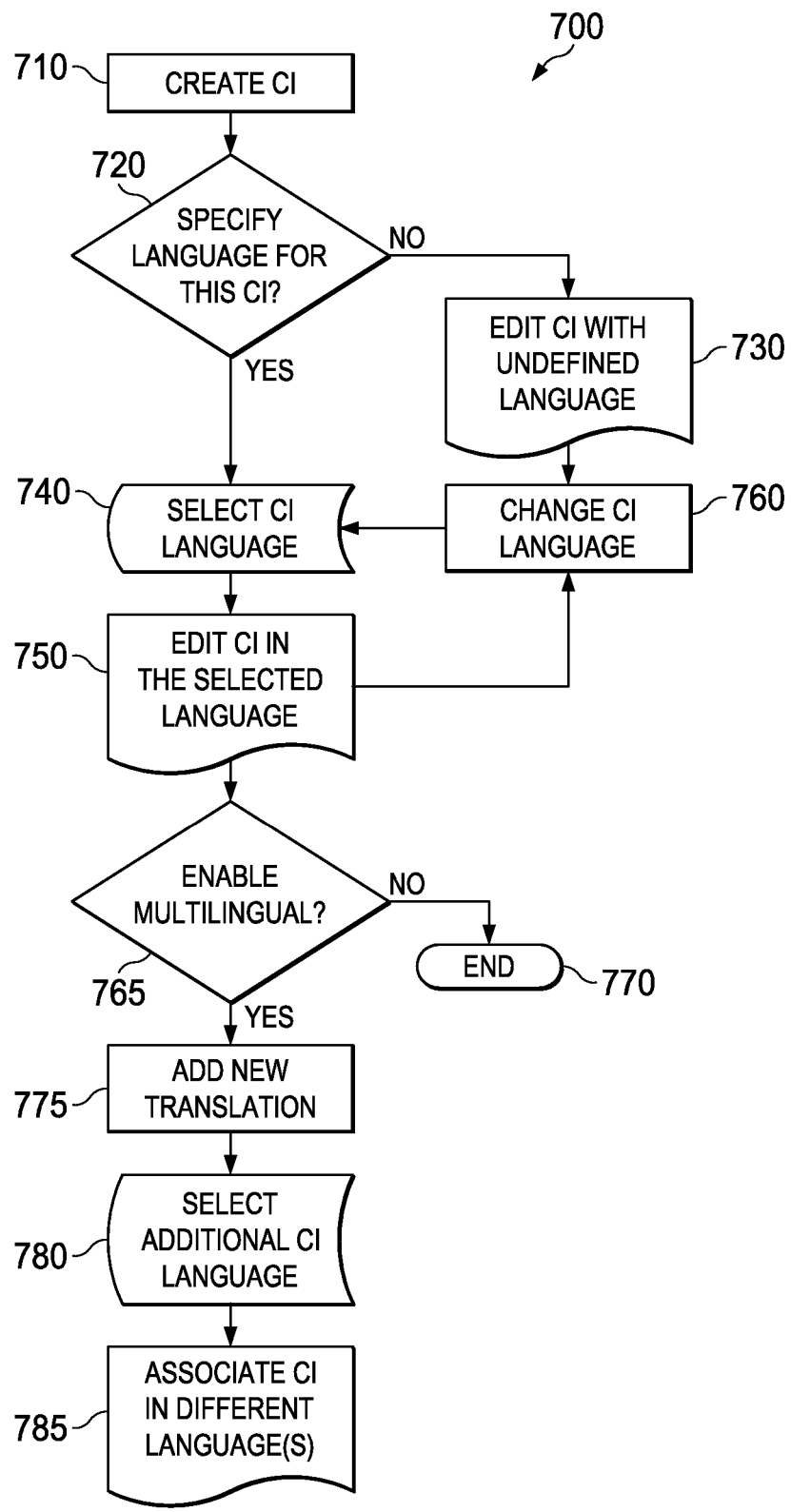
FIG. 7 depicts a flow diagram illustrating one embodiment of a method for creating multilingual content.

FIG. 7 depicts a flow diagram illustrating one embodiment of a method 700 for creating multilingual content.

At step 710, a content item (referred to as "CI" in FIG. 7) may be created by a content creator or contributor such as an author in an enterprise computing environment for use by one or more web sites hosted on one or more server machines in the enterprise computing environment. Those skilled in the art will appreciate that a piece of content that is created for a web site may undergo a lifecycle, referred to as the content lifecycle, as it is managed through various stages. The content lifecycle can be a complex process and can involve a plurality of stages or phases, including content creation, review, approval, publishing, and delivery. The delivery stage may occur at a web tier while the other stages may occur at a management tier, as further described below. Each content item can have its own lifecycle, separate and independent from the lifecycles of other content items. Content items that have not yet been published are not accessible by end users such as web site visitors outside of the enterprise computing environment. As described above, the content contributor may create the content item using a content item editing program (e.g., content item editing program 410 shown in FIG. 4). Also, as described above, the content item can be a static file such as a text file, image, or audio/file or a content instance such as a database table.

At step 720, the content contributor may determine whether to specify a language or locale for the content item. This can be done via a language widget in the content item editing program. For example, referring to FIG. 4, a user of content item editing program 410 may decide not to specify any language for a content item "new Story" by not changing the default setting "No Selection" of language widget 420. If no language is to be specified for the content item (e.g., no selection of a language is made via language widget 420), method 700 may proceed to step 730. Otherwise, method 700 may proceed to step 740.

At step 730, the content contributor or another user such as an editor may edit the content item in the undefined language. The content item "new Story" can be edited in English, although the language attribute for the content item remains undefined. In this example, since the content item "new Story" has no defined language, it can be considered a "non-multilingual" content item. The default language setting for the content item can be changed (e.g., at step 760), causing method 700 to proceed to step 740 which, in turn, transforms the content item from "non-multilingual" to "monolingual".

At step 740, a language is selected for the content item. For example, referring to FIG. 4, a language can be selected for the content item "new Story" from a dropdown menu of language widget 420.

At step 750, the content item can be edited in the selected language. At this point, a need may rise to change the selected language for the content item. If so, method 700 may proceed to step 760. Otherwise, method 700 may proceed to step 765.

At step 760, the language attribute of the content item may be changed. Prior to step 760, the language attribute may be undefined (step 730) or it may specify a selected language (step 750) as described above. The language attribute of the content item may be changed by selecting a new language for the content item (step 740). The above-described process involving steps 740, 750, and 760 may be repeated as appropriate. If there is no need to change the language for the content item, method 700 may proceed to step 765.

At step 765, a decision may be made to ascertain whether the content item is multilingual enabled. If the content item is not multilingual enabled, method 700 may end at step 770 and the content item may be managed as a monolingual content item. If the content item is multilingual enabled, method 700 may proceed to step 775. According to one embodiment, a content item may be identified as being multilingual enabled via a metadata attribute associated with the content item classifying the content item as a multilingual enabled. In one embodiment, an attribute classifying the content item as a multilingual enabled may be dynamically changed at any time.

At step 775, it may be determined that a translation of the content item is needed. Note that a user can optionally add any translation to a multilingual enabled content item. Furthermore, since the content item is multilingual enabled, it is automatically a member of a translation group. Any translation of the content item is also automatically a member of the same translation group. Each member of the translation group as well as the translation group itself can be identified by the same translation group identifier. Each member of the translation group is treated as a monolingual content item while the translation group is treated as a composite multilingual content item.

At step 780, a translation of the content item may be added by various translation methods, some examples of which have been described above. As a specific example, a translation of the content item may be added by selecting an available translation language from a list of target translation languages presented to the content contributor or another user such as an editor or reviewer. According to one embodiment, one or more target translation languages can be selected.

At step 785, the selection of one or more target translation languages may result in the content item being associated with one or more translations. Each of the one or more translations can have a global unique identifier (GUID) and share the same translation group identifier (TGID) with other members of the translation group. GUIDs and TGIDs are described in more detail below.

Figure 8:
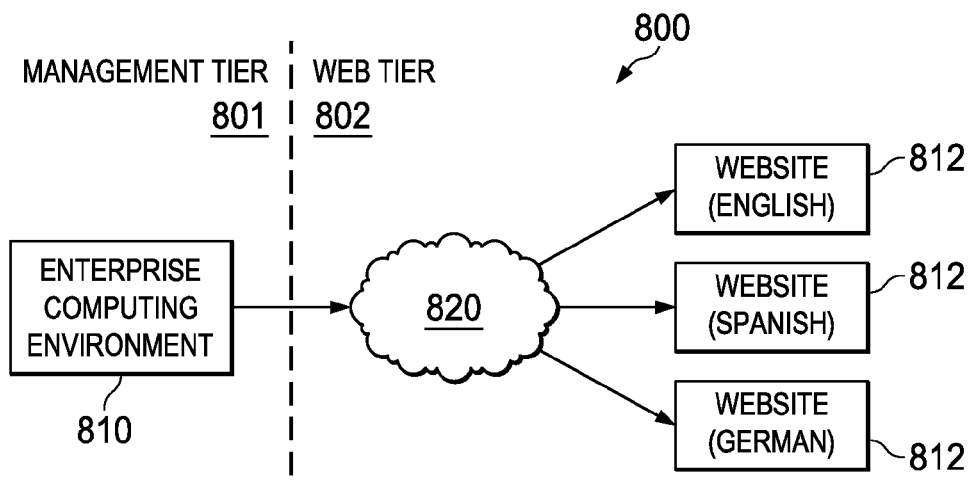
FIG. 8 depicts a diagrammatic representation of one example of a system utilizing multilingual content in accordance with one embodiment.

FIG. 8 depicts a diagrammatic representation of one example of a system 800 utilizing multilingual content items. As illustrated in FIG. 8 (and with reference to FIG. 1), system 800 may include a management tier 801 and a web tier 802. Web tier 802 may include a web site 812. Management tier 801 may include a multilingual content management system (e.g., MCM 70), repository (e.g., repository 80), and client computers (e.g., client devices 30 and 40) for creating and managing a collection of objects for web site 812 via an enterprise computing environment 810. The collection of objects may include a plurality of multilingual content items created, for example, via an embodiment of method 700 described above.

The multilingual content items thus created can be published and delivered (e.g., by web server 66) over a network 820 to visitors of web site 812. Note that network 820 need not be a public network such as the World Wide Web, although the term "web" is used to refer to web site 812. Those skilled in the art appreciate that network 820 may represent various types of networks. For instance, network 820 may represent a private network or intranet. In this case, web site 812 may represent a network site accessible by users in the private network or intranet but not accessible by users outside of the private network or intranet. Regardless of the type of network 820 where web site 812 resides, according to embodiments, the same logical web site 812 can be dynamically rendered in different languages in real time.

Figure 9:
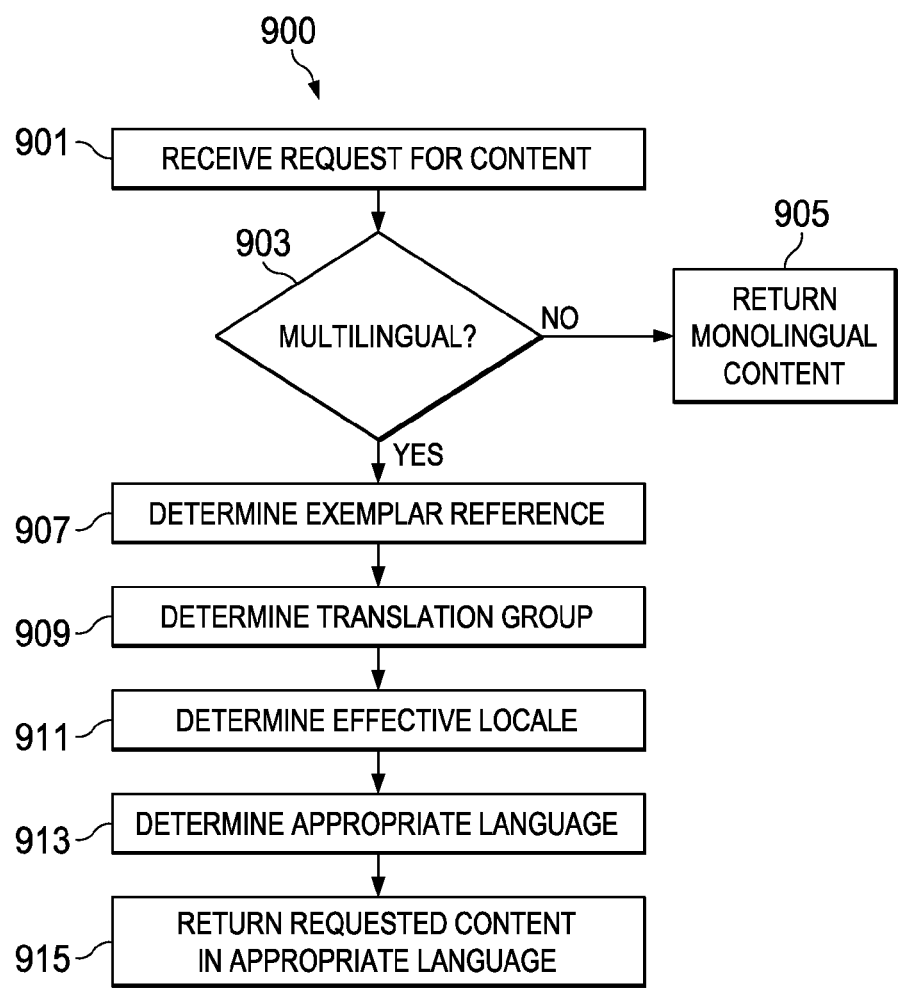
FIG. 9 depicts a flow diagram illustrating one embodiment of a method for dynamically delivering content in a language appropriate for a web site visitor.
Figure 10:
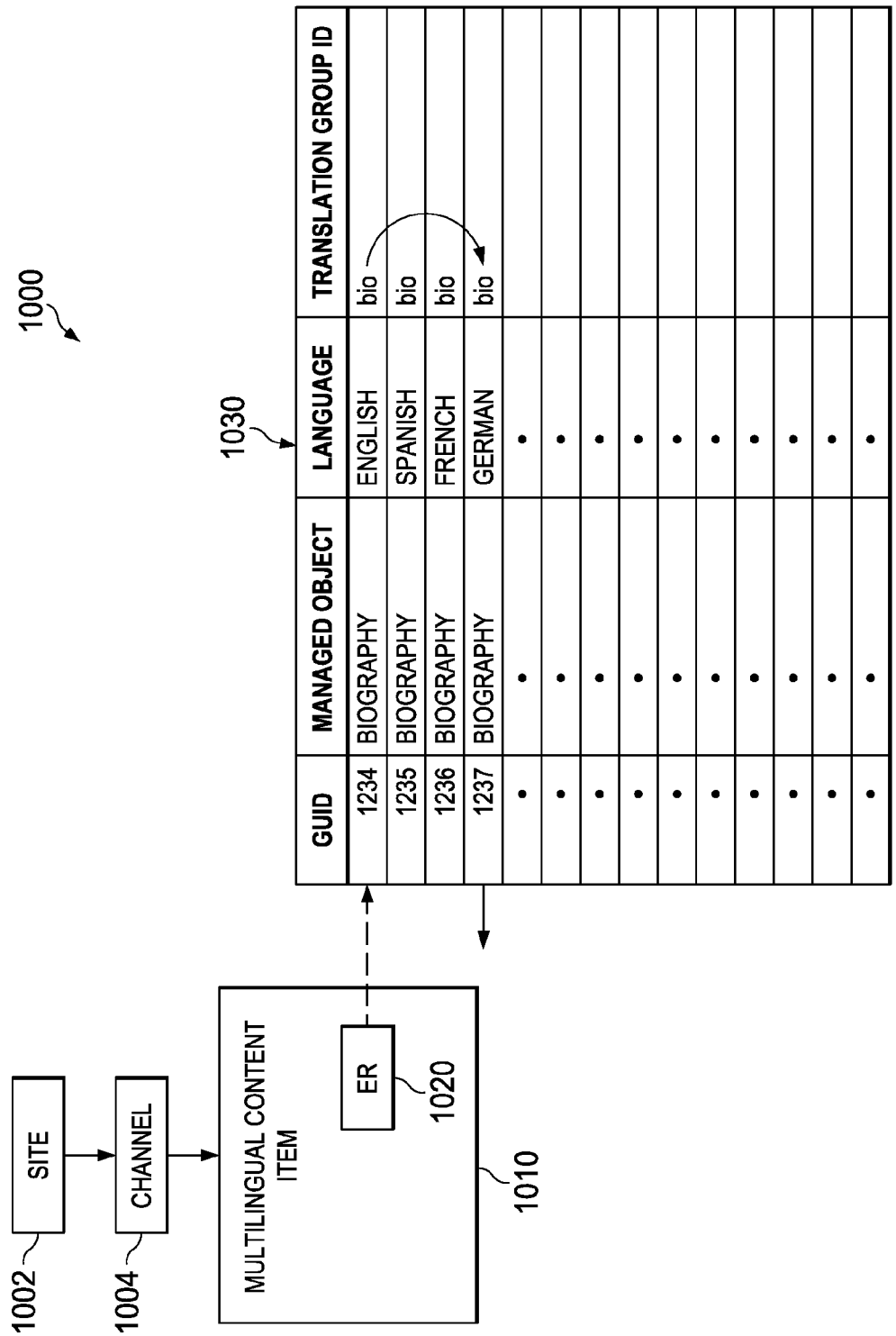
FIG. 10 depicts a diagrammatic representation of one example of a method for selecting content in an appropriate language for locale based content delivery.

FIG. 9 depicts a flow diagram illustrating one embodiment of a method 900 for dynamically delivering content to a web site visitor. FIG. 10 depicts a diagrammatic representation of one example of a method 1000 for selecting multilingual content in an appropriate language for locale based content delivery.

At step 901, a request for content may be received at a web server (e.g., web server 66 shown in FIG. 1) from a client device communicatively connected to the web server (e.g., client device 20 shown in FIG. 1). Responding to such a request for content can be a very complex process as the requested content may involve multiple references to various types of managed objects. For example, referring to FIG. 10, a request for content may contain a reference to a site 1002 which may contain a reference to a channel 1004 which, in turn, may contain one or more references to one or more content items (e.g., content item 1010), etc. As described above, each content item can be a content instance or a static file, each of which may contain zero or more references to other content instances and/or static files. All of these references must be resolved correctly, timely, and efficiently. To facilitate this process, metadata may be utilized.

According to embodiments, metadata for managed objects such as sites, channels, and/or content items in an enterprise computing environment can be stored in a data structure, such as a table 1030 shown in FIG. 10. Table 1030 may be configured to store metadata for managed objects. In one embodiment, table 1030 may contain information for all the managed objects in an enterprise computing environment. In one embodiment, table 1030 may contain information for all the managed objects in a collection of objects for a web site (e.g., site 1002). Objects within table 1030 that are translations of each other may be grouped together by associating the same translation group identification with those objects.

Each entry in table 1030 may include a global user identifier (GUID), a name, and a language for a managed object, and a translation group identifier (TGID) to which the managed object is assigned. As described above, when defining a content type, multilingual may be enabled, for instance, by enabling a multilingual attribute of the content type (e.g., multilingual 330 shown in FIG. 3). Managed objects created based on such a content type can also be multilingual enabled.

Referring back to FIG. 9, at step 903, a determination may be made as to whether a managed object referenced in the request for content is multilingual. This can be done by a multilingual content management system (e.g., MCM 70) in communication with the web server. The multilingual content management system may check the multilingual attribute for the managed object. If the multilingual attribute for the managed object is not enabled, the managed object is not multilingual. In the example of FIG. 10, content item 1010 is of a multilingual enabled content type and thus can be considered as a multilingual content item.

At step 905, if the managed object is not multilingual, the multilingual content management system may interpret the GUID for the managed object as an absolute reference to a single, monolingual content item. The GUID, in this case, can be utilized by the multilingual content management system to retrieve the monolingual content item (e.g., from a repository) and return to the web server for dynamic assembly and/or delivery of the requested content to the client device.

At step 907, the GUID of a content item whose multilingual attribute reflects that the content item is multilingual enabled may be interpreted as an exemplar reference. Returning to FIG. 10, suppose multilingual content item 1010 represents a managed object called "Biography" identified by the GUID "1234". In this case, the GUID "1234" can be interpreted as an exemplar reference (e.g., ER 1020).

Referring back to FIG. 9, at step 909, the exemplar reference can be utilized to determine a TGID for the translation group to which it belongs. As noted above, when a content instance is created, it can be created as part of a translation group and automatically assigned a TGID. Each member of the translation group may be dynamically added to or removed from the translation group at any time. Furthermore, each member of the translation group can be managed, published, and delivered independent of other members in the translation group. As FIG. 10 illustrates, four translations are assigned to the same translation group "bio". In this case, exemplar reference 1020 of content item 1010 can be utilized to determine that content item 1010 belongs to the translation group "bio". Utilizing the translation group identifier "bio", it can be determined that four different human languages—English, Spanish, French, and German—are associated with a managed object named "Biography". As described above, any one of these languages can be the source language, with the other languages being the translations of the source language. One of the translations may be appropriate for delivery to the client device.

At step 911, prior to selecting an appropriate translation, an effective locale/language may be determined. This can be done, for example, by parsing the request for content for locale or language identifier that may be set as properties or preferences for the client device or a browser running on the client device. As another example, if the user has registered with the web site, the locale and/or language may be determined based on user preference(s). As yet another example, a default setting may be utilized.

At step 913, an appropriate language may be determined based on the effective locale. Referring to FIG. 10, suppose exemplar reference 1020 points to an English translation of "Biography" in the translation group "bio". However, suppose the effective locale is determined to be Germany. Instead of returning the English translation of "Biography", exemplar reference 1020 may be used to find a German translation of "Biography" in the same translation group to suit the effective locale of Germany. If the effective locale is determined to be Japan and there is not a Japanese translation in the translation group, then the default "Biography" may be returned, according to one embodiment.

At step 915, the selected translation appropriate for the effective locale (e.g., the German translation of "Biography") is retrieved and delivered, along with other appropriate managed objects, to the client device in response to the request for content from the client device. The above described example method 900 can occur dynamically in real time.

As discussed above, it is desirable for content items that are translations of each other to be grouped into a translation group to facilitate the management, translation, and segmentation of web sites and pages into multiple languages. Advantageously, embodiments described herein allow translation groups to be added in an evolutionary manner. This provides flexibility in converting a monolingual (or non-multilingual) content management system into a multilingual content management system where users can readily create multilingual managed objects such as content items and sites from scratch, or upgrade/migrate existing, monolingual managed objects.

In this context, exemplar references provide a mechanism through which existing objects can be transformed and adapted to a new multilingual content management system. Specifically, each exemplar reference may refer to either a discrete translation or a composite, multilingual group of translations. This can allow preservation of investments on systems and web sites that are already created upon the systems and web sites being upgraded to multilingual systems, while avoiding the reference maintenance cost and complexity associated with translation-centric models. Further, translation group management provides a flexible, bidirectional migration path between monolingual and multilingual content, allowing incremental and independent introduction of translations while avoiding the tighter coupling of life-cycles associated with object-centric models.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments of the present invention can be implemented in a computer communicatively coupled to a network (for example, the Internet, an intranet, an internet, a wide area network (WAN), a local area network (LAN), a storage area network (SAN), etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments.

It is also within the spirit and scope of the invention to implement in software programming or steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system, comprising:
   at least one processor;
   at least one non-transitory computer readable medium storing instructions translatable by the at least one processor, the instructions when translated by the at least one processor cause the system to provide content management and locale-specific delivery of managed linguistic translations of web site content by:
   responsive to a request for content from a client device communicatively connected to a web server in an enterprise computing environment, dynamically resolving the request for content by:
      determining an exemplar linguistic translation reference, the exemplar linguistic translation reference identifying a managed web site content object associated with the content requested by the client device, the web site content object having a multilingual attribute indicating that the managed web site content object is multilingual, the managed web site content object being stored in a repository residing in the enterprise computing environment;
      determining a linguistic translation group utilizing the exemplar linguistic translation reference, the linguistic translation group including translation group content items representing same content translated into different languages;
      determining, from the determined linguistic translation group, one or more human languages associated with the managed web site content object;
      determining an effective locale for the request for content;
      determining, from the one or more human languages in the linguistic translation group and based on the effective locale, a language that is appropriate for the effective locale;
      retrieving a managed content item from the repository, wherein the managed content item is part of the linguistic translation group and represents a linguistic translation for the managed web site content object in the language that is appropriate for the effective locale; and
   responding to the request for content by dynamically rendering and delivering the managed content item that is in the language appropriate for the effective locale.

2. The system of claim 1, wherein the instructions further comprise:
   determining whether the managed web site content object is multilingual enabled.

3. The system of claim 1, wherein the managed content item includes a plurality of managed content items, the plurality of managed content items is assigned a translation group identifier, and each of the managed content items is assigned a unique identifier.

4. The system of claim 1, wherein the instructions further comprise:
   adding or deleting the managed content item from the translation group.

5. The system of claim 1, wherein the effective locale is determined by parsing locale information contained in the request for content.

6. The system of claim 1, wherein the effective locale is determined based on user information maintained in the enterprise computing environment.

7. The system of claim 1, wherein the managed content item represents a content instance of a content type or a static file.

8. The system of claim 1, wherein the effective locale is declared as required for a site through which the request for content is received and wherein the instructions further comprise automatically including members of the translation group in a publication operation when one of the members is published to the site.

9. A computer program product comprising at least one non-transitory computer readable medium storing instructions translatable by at least one processor, the instructions when translated by the at least one processor cause a system to provide content management and locale-specific delivery of managed linguistic translations of web site content by:
   responsive to a request for content from a client device communicatively connected to a web server in an enterprise computing environment, dynamically resolving the request for content by:
      determining an exemplar linguistic translation reference, the exemplar linguistic translation reference identifying a managed web site content object associated with the content requested by the client device, the web site content object having a multilingual attribute indicating that the managed web site content object is multilingual, the managed web site content object being stored in a repository residing in the enterprise computing environment;

determining a linguistic translation group utilizing the exemplar linguistic translation reference, the linguistic translation group including translation group content items representing same content translated into different languages;

determining, from the determined linguistic translation group, one or more human languages associated with the managed web site content object;

determining an effective locale for the request for content;

determining, from the one or more human languages in the linguistic translation group and based on the effective locale, a language that is appropriate for the effective locale;

retrieving a managed content item from the repository, wherein the managed content item is part of the linguistic translation group and represents a linguistic translation for the managed web site content object in the language that is appropriate for the effective locale; and responding to the request for content by dynamically rendering and delivering the managed content item that is in the language appropriate for the effective locale.

10. The computer program product of claim 9, wherein the instructions further comprise:
determining whether the managed web site content object is multilingual enabled.

11. The computer program product of claim 9, wherein the managed content item includes a plurality of managed content items, the plurality of managed content items is assigned a translation group identifier, and each of the managed content items is assigned a unique identifier.

12. The computer program product of claim 9, wherein the instructions further comprise:
adding or deleting the managed content item from the translation group.

13. The computer program product of claim 9, wherein the effective locale is determined by parsing locale information contained in the request for content.

14. The computer program product of claim 9, wherein the effective locale is determined based on user information maintained in the enterprise computing environment.

15. The computer program product of claim 9, wherein the managed content item represents a content instance of a content type or a static file.

16. The computer program product of claim 9, wherein the effective locale is declared as required for a site through which the request for content is received and wherein the instructions further comprise automatically including members of the translation group in a publication operation when one of the members is published to the site.

17. A method, comprising:
in response to a request for content received from a client device communicatively connected to a web server in an enterprise computing environment, a system dynamically resolving the request for content, the system being communicatively connected to the web server and embodied on non-transitory computer memory, wherein dynamically resolving the request for content comprises:

the system determining an exemplar linguistic translation reference, the exemplar linguistic translation reference identifying a managed web site content object associated with the content requested by the client device, the web site content object having a multilingual attribute indicating that the managed web site content object is multilingual, the managed web site content object being stored in a repository residing in the enterprise computing environment;

the system determining a linguistic translation group utilizing the exemplar linguistic translation reference, the linguistic translation group including translation group content items representing same content translated into different languages;

the system determining, from the determined linguistic translation group, one or more human languages associated with the managed web site content object;

the system determining an effective locale for the request for content;

the system determining, from the one or more human languages in the linguistic translation group and based on the effective locale, a language that is appropriate for the effective locale;

the system retrieving a managed content item from the repository, wherein the managed content item is part of the linguistic translation group and represents a linguistic translation for the managed web site content object in the language that is appropriate for the effective locale; and the web server responding to the request for content by dynamically rendering and delivering the managed content item that is in the language appropriate for the effective locale.

18. The method of claim 17, wherein the managed content item includes a plurality of managed content items, the plurality of managed content items is assigned a translation group identifier, and each of the managed content items is assigned a unique identifier.

19. The method of claim 17, further comprising:
adding or deleting the managed content item from the translation group.

20. The method of claim 17, wherein the effective locale is determined by parsing locale information contained in the request for content.

21. The method of claim 17, wherein the effective locale is determined based on user information maintained in the enterprise computing environment.

22. The method of claim 17, wherein the managed content item represents a content instance of a content type or a static file.

23. The method of claim 17, wherein the effective locale is declared as required for a site through which the request for content is received and further comprising the system automatically including members of the translation group in a publication operation when one of the members is published to the site.

* * * * *